(12) United States Patent
Burchard

(10) Patent No.: US 9,555,875 B2
(45) Date of Patent: Jan. 31, 2017

(54) AIRCRAFT FLAP SYSTEM WITH AILERON FUNCTIONALITY

(71) Applicant: AIRBUS OPERATIONS GMBH, Hamburg (DE)

(72) Inventor: Alexander Burchard, Stuhr (DE)

(73) Assignee: Airbus Operations GmbH, Hamburg (DE)

(*) Notice: Subject to any disclaimer, the term of this patent is extended or adjusted under 35 U.S.C. 154(b) by 174 days.

(21) Appl. No.: 14/285,712

(22) Filed: May 23, 2014

(65) Prior Publication Data

US 2015/0191240 A1     Jul. 9, 2015

(30) Foreign Application Priority Data

May 28, 2013  (EP) .................................. 13169534

(51) Int. Cl.
*B64C 3/50* (2006.01)
*B64C 9/18* (2006.01)
(Continued)

(52) U.S. Cl.
CPC . *B64C 9/18* (2013.01); *B64C 9/04* (2013.01); *B64C 9/16* (2013.01); *B64C 13/38* (2013.01);
(Continued)

(58) Field of Classification Search
CPC ............... B64C 9/18; B64C 9/20; B64C 9/04; B64C 9/02; B64C 13/38; B64C 2009/005
See application file for complete search history.

(56) References Cited

U.S. PATENT DOCUMENTS 2,222,435 A * 11/1940 Ksoll ..................... B64C 9/16
244/216
3,853,289 A * 12/1974 Nevermann ............. B64C 9/16
244/215
(Continued)

FOREIGN PATENT DOCUMENTS

DE     3800647 A1 *  7/1989  ............. B64C 13/38
EP     0 205 939       12/1986
(Continued)

OTHER PUBLICATIONS

European Search Report for Application Serial No. 13 16 9534 dated Nov. 6, 2013.

*Primary Examiner* — Philip J Bonzell
(74) *Attorney, Agent, or Firm* — Jenkins, Wilson, Taylor & Hunt, P.A.

(57) ABSTRACT

The present disclosure pertains to an actuation mechanism for a flap with aileron functionality, including a crank having a crank axle, a crank arm and a crank pivot; a displacement shaft articulated to the crank pivot at an actuating end portion; and a rotatable linear-motion bearing in which the displacement shaft is slidably supported, wherein the displacement shaft is fixedly connectable to a flap body of the aircraft flap at a flap end portion of the displacement shaft opposite to the actuating end portion, and wherein the linear-motion bearing is rotatably attachable at a pivot point to an aircraft wing comprising the aircraft flap, so that the displacement shaft is able to rotate around an axis running spanwise of the aircraft wing around the pivot point. The present disclosure further pertains to an aircraft flap with such an actuation mechanism and an aircraft having an aircraft flap.

16 Claims, 2 Drawing Sheets

(51) Int. Cl.
  *B64C 9/04*     (2006.01)
  *B64C 9/16*     (2006.01)
  *B64C 13/38*    (2006.01)
  *B64C 9/00*     (2006.01)

(52) U.S. Cl.
  CPC .......... *B64C 2009/005* (2013.01); *Y02T 50/32* (2013.01); *Y10T 74/18216* (2015.01)

(56) References Cited

U.S. PATENT DOCUMENTS

| | | |
|---|---|---|
| 4,544,118 A | 10/1985 | Robinson |
| 4,702,442 A * | 10/1987 | Weiland ................ B64C 9/16 244/216 |
| 4,705,236 A | 11/1987 | Rudolph |
| 4,763,862 A | 8/1988 | Steinhauer et al. |
| 7,293,744 B2 | 11/2007 | Perez-Sanchez et al. |
| 7,520,471 B2 | 4/2009 | Reckzeh |
| 7,798,450 B2 | 9/2010 | Patzelt et al. |
| 8,444,094 B2 | 5/2013 | Voss et al. |
| 2002/0047068 A1* | 4/2002 | Uchida ................ B64C 3/50 244/99.3 |
| 2005/0011994 A1* | 1/2005 | Sakurai ................ B64C 9/16 244/212 |
| 2011/0011984 A1* | 1/2011 | Voss ................ B64C 9/24 244/214 |

FOREIGN PATENT DOCUMENTS

| | | | |
|---|---|---|---|
| EP | 1 404 573 | 11/2004 | |
| EP | 1 663 777 | 11/2007 | |
| GB | 2068312 A * | 8/1981 | ............... B64C 9/16 |

* cited by examiner

AIRCRAFT FLAP SYSTEM WITH AILERON FUNCTIONALITY

CROSS-REFERENCE TO RELATED APPLICATION

This application claims benefit of and priority to European patent application No. 13 169 534.8 filed May 28, 2013, the entire disclosure of which is herein incorporated by reference.

TECHNICAL FIELD

The present invention relates to an actuation mechanism for an aircraft flap with aileron functionality, to a flap with aileron functionality having such an actuation mechanism and an aircraft including a flap with aileron functionality.

BACKGROUND

Aircraft usually have several movable control surfaces attached to the trailing edges of a wing that are used to fulfil different functions.

A typical aileron is hingedly attached to a profile of the wing. The aileron is able to be pivotably rotated around a pivot point resulting in positive or negative actuation with regard to the horizontal plane of the wing profile. The kinematic hinge may be located within or out of the profile of the wing. A usual range of angular displacement $\pm\delta$ is between $\pm 30°$.

Other mechanisms, such as the one known as "dropped hinge flap" due to the relatively to the wing profile "dropped hinge" and pivot point, are for example shown in document U.S. Pat. No. 7,520,471 B2 which illustrates the principles underlying the dropped hinge flap in more detail.

Negative angular movement $-\delta$ would be desirable to provide a flap with aileron functionality. However, the flap body of a conventional flap may undesirably penetrate into the wing profile when being actuated in a negative angular movement $-\delta$. Thus, with the conventional dropped hinge flap mechanism, additional measures would have to be taken to provide the flap with aileron functionality.

Other approaches to combined flaps and ailerons have been proposed for example in the documents U.S. Pat. No. 4,544,118 A and U.S. Pat. No. 4,763,862 A. In both documents, a flap is pivotably mounted on a roller running chordwise in a roller guide. Thereby, a horizontal translatory movement towards the trailing edge can be achieved, while at the same time being able to independently pivot the flap around the roller. Such mechanisms are generally known as Fowler-type flaps.

SUMMARY

One idea is therefore to provide a multi-functional flap and aileron component which can be actuated in such a way that all advantages of separate ailerons and flaps may be retained, while being mechanically less complex to implement.

A first aspect of the disclosure is directed to an actuation mechanism for an aircraft flap with aileron functionality, comprising a crank having a crank axle, a crank arm and a crank pivot; a displacement shaft articulated to the crank pivot at an actuating end portion; and a rotatable linear-motion bearing in which the displacement shaft is slidably supported, wherein the displacement shaft is fixedly connectable to a flap body of the aircraft flap at a flap end portion of the displacement shaft opposite to the actuating end portion, and wherein the linear-motion bearing is rotatably attachable at a pivot point to an aircraft wing comprising the aircraft flap, so that the displacement shaft is able to rotate around an axis running spanwise of the aircraft wing around the pivot point.

A second aspect of the disclosure is directed to an aircraft flap with aileron functionality, comprising a flap body, and an actuation mechanism according to the first aspect of the disclosure, wherein the displacement shaft is fixedly connected to a flap body of the aircraft flap at the flap end portion of the displacement shaft.

A third aspect of the disclosure is directed to a an aircraft, comprising at least one aircraft wing and at least one aircraft flap with aileron functionality according to the second aspect of the disclosure, the aircraft flap being arranged at a trailing edge of the aircraft wing.

The idea on which the present disclosure is based is to provide a multi-functional control surface for the trailing edge of an aircraft wing that is both able to aid in producing lift and in control the banking movements of the aircraft. In particular, the lift assistance functionality may be more efficient than for a simple positively actuated conventional aileron since the wing profile may be increased in chord length as well as in camber.

The construction of the actuation mechanism of the aircraft flap allows for smooth transitions between the different flap components creating smooth wing surfaces. This means, that the airstream may be bent efficiently and without major velocity losses. Due to reduced vortex creation, the noise emission of the aircraft wing may be significantly reduced as well.

Both landing flap functionality as well as aileron functionality may be retained without having to put up with cut-backs. This means that the aircraft flaps according to the invention may be equally used instead of separate ailerons and landing flaps without having to accept compromises. Finally, the aircraft flaps according to the invention may also be used for trimming purposes during cruise flight.

According to an embodiment of the actuation mechanism, the linear-motion bearing may be a spherical plain bearing or a spherical rolling element bearing.

According to a further embodiment of the actuation mechanism, the crank may be actuated by a linear actuator, in particular a hydraulic actuator, a pneumatic actuator, a rack and pinion drive actuator, a spindle actuator or a chain drive actuator. According to an alternative embodiment of the actuation mechanism, the crank may be actuated by a rotary actuator, in particular a hydraulic rotary actuator, a pneumatic rotary actuator or a mechanical rotary actuator. Those different types of actuating mechanisms advantageously aid in adapting the flap actuator to existing actuating mechanisms in the aircraft or the aircraft wing, respectively.

According to an embodiment of the aircraft flap, the aircraft flap may further comprise a rotary vane fixedly attached to the linear-motion bearing, wherein the outer surface of the rotary vane proximate to the flap body has a contour substantially conforming to the contour of the flap body. This rotary vane aids in guiding the airstream along the lower surface of the aircraft wing through an airstream gap which may be created by fowlering the flap body away from the trailing edge of the aircraft wing. The upper surface of the flap body is then advantageously arranged in substantially the same direction as the outer surface of the rotary vane proximate to the flap body, thereby maintaining a substantially unperturbed airstream through the gap and over the upper surface of the flap body.

According to a further embodiment of the aircraft flap, the rotary vane may comprise an outer surface distal to the flap body which has a contour substantially conforming to the contour of the aircraft wing. Such a rotary vane aids in keeping the upper surface of the aircraft wing flush with the upper surface of the flap body in order to advantageously keep the airstream along the aircraft flap as unperturbed and free of vortices as possible.

According to a further embodiment of the aircraft flap, the aircraft flap may further comprise a hinged aerofoil edge portion hingably attachable to a downside surface of the aircraft wing. This hinged aerofoil edge portion closes any eventually appearing gaps between the flap body or the rotary vane and the aircraft wing profile, advantageously aiding in maintaining a smooth and perturbation-free lower surface of the aircraft wing in each actuation state of the actuator.

According to a further embodiment of the aircraft flap, the hinged aerofoil edge portion may be connected to the outer surface of the rotary vane proximate to the flap body by means of a linear slide bearing. This connection type enables the actuator to have complete control over the movement of the flap body, the rotary vane and the hinged aerofoil edge portion by a common actuation mechanism at the crank, thereby advantageously simplifying the mechanical implementation of the aircraft flap.

According to a further embodiment of the aircraft flap, the crank arm in actuatable in such a way, that the displacement shaft is pivotable around the pivot point of the linear-motion bearing within a range between a maximum negative pivot angle and a maximum positive pivot angle with respect to a neutral position of the displacement shaft. According to an advanced embodiment of the aircraft flap, the neutral position of the displacement shaft corresponds to a cruise flight position of the aircraft flap. According to a further advanced embodiment of the aircraft flap, the maximum negative pivot angle corresponds to a maximum banking control position of the aircraft flap, and wherein the maximum positive pivot angle corresponds to a maximum lift assistance position of the aircraft flap.

Those measures enable the aircraft flap to be employed as multi-functional flap for an aircraft wing, providing both landing flap functions as well as aileron functions to the operator of the aircraft. Thus, it may advantageously be possible to combine ailerons and landing flaps in a single aircraft flap type according to the invention, and to address the different functions only by choosing the appropriate actuation range of the actuator.

According to an embodiment of the aircraft, the pivot point of the linear-motion bearing may be located within the outer profile of the aircraft wing. This is advantageous for reduction of the air drag created by the aircraft wing, since the profile surfaces of the wing may be kept smooth.

According to a further embodiment of the aircraft, the aircraft may comprise a plurality of aircraft flaps, all of which are used both as landing flaps and as ailerons.

BRIEF DESCRIPTION OF THE DRAWINGS

The invention will be explained in greater detail with reference to exemplary embodiments depicted in the drawings as appended.

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

Figure 1:
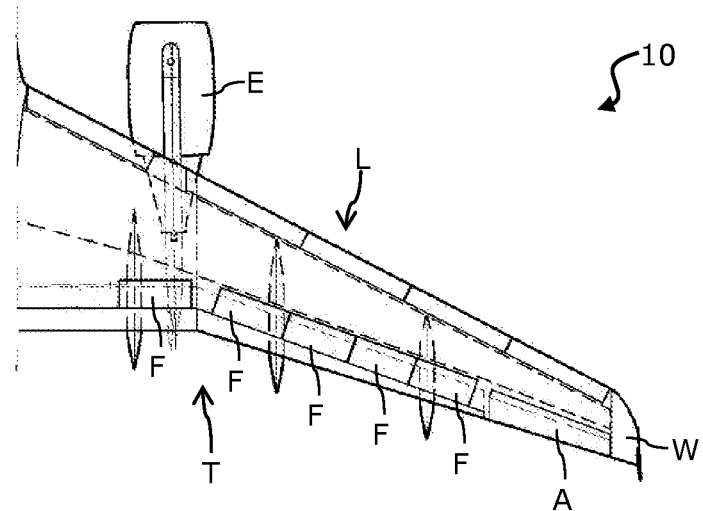
FIG. 1 schematically illustrates a top down view of an exemplary wing of an aircraft.

In the figures, like reference numerals denote like or functionally like components, unless indicated otherwise. Any directional terminology like "top", "bottom", "left", "right", "above", "below", "horizontal", "vertical", "back", "front", "clockwise", "counter-clockwise" and similar terms are merely used for explanatory purposes and are not intended to delimit the embodiments to the specific arrangements as shown in the drawings.

DETAILED DESCRIPTION

Although specific embodiments have been illustrated and described herein, it will be appreciated by those of ordinary skill in the art that a variety of alternate and/or equivalent implementations may be substituted for the specific embodiments shown and described without departing from the scope of the present invention. Generally, this application is intended to cover any adaptations or variations of the specific embodiments discussed herein.

Flaperons or flaps with aileron functionality in the sense of the present invention are intended to denote any type of aircraft control surfaces that have combined flap and aileron functionality. In particular, flaperons in the sense of the present invention may refer to hinged flight control surfaces of a fixed-wing aircraft that may be attached to the trailing edge of a wing. Flaperons within the meaning of the invention may particularly comprise Fowler-type flap functionality, i.e. being able to slide towards the trailing edge of the wing before hinging downwards, thus increasing both chord length and camber of the wing.

For sake of brevity of description, the terms "flaperon" and "flap with aileron functionality" may be used interchangeably throughout the application documents.

FIG. 1 shows a schematical illustration of a top down view of an exemplary wing 10 of an aircraft. The wing 10 is exemplarily shown with a jet engine E, a leading edge L, a trailing edge T and a wing tip W. The aircraft moves during normal flight towards the direction of the leading edge L. The edge-to-edge distance between the leading edge L and the trailing edge T parallel to the movement direction of the aircraft is known as the chord length of the wing 10.

Apart from air brakes (spoilers) there are several control surfaces arranged in a spanwise direction of the wing 10. For example, one or more high-lift flaps F are used to generate additional lift during starting and/or landing of the aircraft.

While the flaps are usually arranged proximal to the aircraft main body, one or more ailerons A are arranged distally to the aircraft body near the wing tip W. The ailerons A are typically used for tilting the lift vector of the wing 10, thus leading to rolling or banking movements of the aircraft around its horizontal axis in movement direction.

Figure 2:
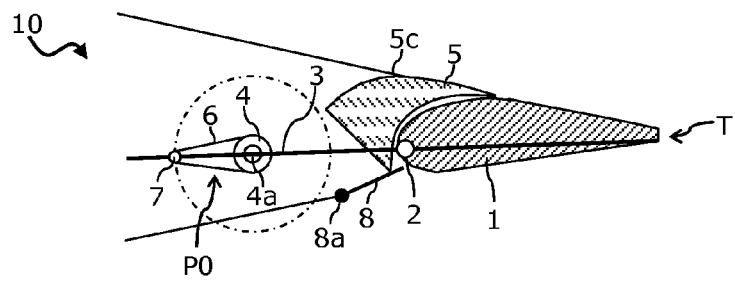
FIG. 2 schematically illustrates a cross section of an aircraft flap according to an embodiment of the present invention in a neutral position.

FIG. 2 shows a schematic illustration of a cross section of an aircraft wing 10 with an aircraft flap in a neutral position P0. The neutral position P0 may correspond to a cruise flight position of the aircraft flap. What is shown is the trailing edge portion of the aircraft wing 10. Within the aircraft wing 10 an actuation mechanism for an aircraft flaperon is arranged. The actuation mechanism includes a crank 4 having a crank axle 4a, a crank arm 6 and a crank pivot 7. The crank arm 6 is able to rotate around the crank axle 4a with the crank pivot 7 describing a circle (denoted by a chain line in FIGS. 2 to 5) around the centre of the crank 4. The crank 6 may be actuated by a linear actuator, for example a hydraulic actuator, a pneumatic actuator, a rack and pinion drive actuator, a spindle actuator or a chain drive actuator. Alternatively, it may be possible to actuate the crank 4 by a rotary actuator, for example a hydraulic rotary actuator, a pneumatic rotary actuator or a mechanical rotary actuator. The actuating mechanism of the crank 4 may be chosen according to construction design considerations of the aircraft wing 10.

The actuation mechanism further comprises a displacement shaft 3 that is articulated to the crank pivot 7 at an actuating end portion. The actuating end portion of the displacement shaft 3 is pointing towards the leading edge of the aircraft wing 10 while a flap end portion of the displacement shaft 3 opposite to the actuating end portion is pointing towards the trailing edge of the aircraft wing 10. The displacement shaft 3 is slidably supported within a rotating or rotatable linear-motion bearing 2. The rotating or rotatable linear-motion bearing 2 may for example be a spherical plain bearing or a spherical rolling element bearing. The rotating or rotatable linear-motion bearing 2 allows for sliding movement of the displacement shaft 3 with regard to the linear-motion bearing 2.

Additionally, the linear-motion bearing 2 is rotatably attached at a pivot point to an aircraft wing 10, i.e. the aircraft wing box structure. This means that apart from a translatory sliding movement of the displacement shaft 3, the displacement shaft 3 may be rotated around this pivot point around an axis that runs spanwise of the aircraft wing 10, i.e. normal to the drawing area of FIGS. 2 to 5.

The displacement shaft 3 is fixedly connected to a flap body 1 of the aircraft flap at the flap end portion of the displacement shaft 3. The movement of the flap body 1 by means of actuation of the crank 4 will be explained further below in conjunction with FIGS. 3 to 6.

The aircraft flap further comprises a rotary vane 5 which is fixedly attached to the linear-motion bearing 2. The rotary vane 5 may be a drawbar or guiding body that follows the movement of the linear-motion bearing 2 in order to keep the interface between the flap body 1 and the outer edges of the aircraft wing profile 10 as smooth as possible, irrespective of the actuation position of the flap body 1.

In particular, the outer surface 5b of the rotary vane 5 which is located proximate to the flap body 1, i.e. near the bottom surface of the aircraft wing 10 may have a contour substantially conforming to the contour of the flap body 1. The outer surface 5a distal to the flap body 1 may be determined by the distance between the top surface of the aircraft wing profile 10 and the linear-motion bearing 2 and may have a contour substantially conforming to the contour of the aircraft wing 10. The edge of the top surface of the aircraft wing profile 10 may be bordered by a flexible spring lip 5c, for example made from carbon-fibre reinforced plastics (CFRP) in order to smoothen the interface between the wing 10 and the moving rotary vane 5. The rotary vane 5 itself may for example be made from a metal sheet or CFRP as well.

Furthermore, the aircraft flap may include a hinged aerofoil edge portion 8 that is hingably attached to the bottom surface of the aircraft wing 10 at an aerofoil edge hinge 8a. The hinged aerofoil edge portion 8 may be connected to the outer surface 5b of the rotary vane 5, for example by means of a linear slide bearing. This ensures that the hinged aerofoil edge portion 8 will follow the motion of the rotary vane 5 and always obturate any gap between the rotary vane 5 and the bottom surface of the wing 10 that might arise due to the movement of the rotary vane 5.

Figure 3:
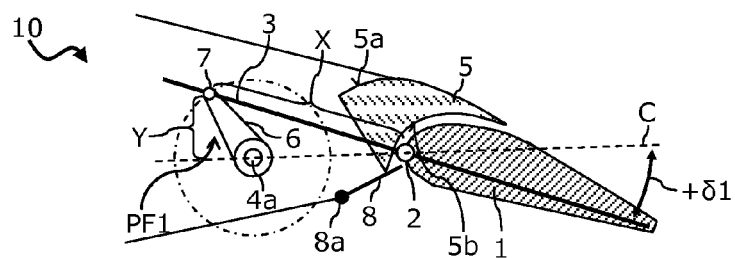
FIG. 3 schematically illustrates a cross section of the flaperon of FIG. 2 in a first actuated position.

FIG. 3 shows a schematical illustration of the aircraft wing 10 of FIG. 2 in a first actuated position PF1 with regard to the neutral position P0 indicated by the centre line C. The first actuated position PF1 may be achieved by moving the crank arm 6 upwards and towards the trailing edge T of the aircraft wing 10. This results in a vertical displacement Y of the crank pivot 7 as well as a variation of the distance X between the crank pivot 7 and the pivot point of the linear-motion bearing 2.

Figure 6:
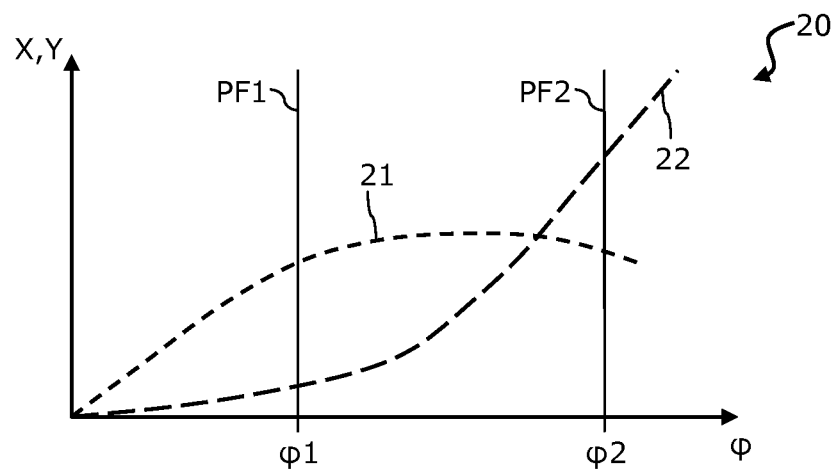
FIG. 6 schematically illustrates an exemplary diagram of displacement progressions of the displacement shaft with increasing crank lever angle of the crank lever in FIGS. 2 to 5.

The vertical displacement Y as well as the variation of the distance X with the crank rotation angle $\phi$ are shown as curves 21 and 22, respectively in the diagram of FIG. 6. In the first actuated position PF1, the vertical displacement Y according to the curve 21 rises sinusoidally with the crank rotation angle $\phi$ reaching a comparatively large value at the crank rotation angle $\phi 1$ corresponding to the first actuated position PF1, while the variation of the distance X, i.e. the translatory movement of the displacement shaft 3 through the linear-motion bearing 2 towards the trailing edge T of the aircraft wing 10 is fairly low compared to the vertical displacement.

This means, that in the first actuated position PF1 the rotary movement portion dominates the translatory movement portion of the flap body 1 such that the flap body 1 moves substantially like an aileron with positive pivot angle. In other words, the first actuated position PF1 may be used for banking control of the aircraft, with the pivot angle +$\delta 1$ being for example about +20°.

Figure 4:
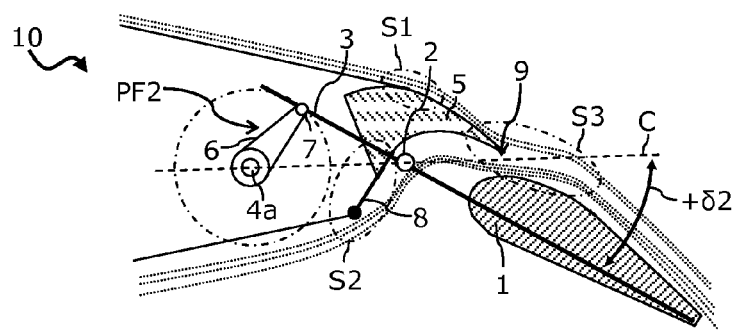
FIG. 4 schematically illustrates a cross section of the flaperon of FIG. 2 in a second actuated position.

FIG. 4 shows a schematical illustration of the aircraft wing 10 of FIG. 2 in a second actuated position PF2. The second actuated position PF2 differs from the first actuated position PF1 in that the crank arm is rotated upwards and towards the trailing edge T of the aircraft wing 10 by a larger crank rotation angle $\phi 2$ than the crank rotation angle $\phi 1$. As can be seen from FIG. 6, the vertical displacement Y barely changes. However, the variation of the distance X greatly increases, so that a large translator movement of the displacement shaft 3 through the linear-motion bearing 2 ensues.

This results in a lengthening of the chord length of the aircraft wing 10 on one hand and in the creation of an airstream gap, generally indicated with 9 in FIG. 4, between the flap body 1 and the rotary vane 5.

First of all, the airstream on the top surface of the aircraft wing 10 is smoothened in the region S1 by choosing an appropriate contour of the upper surface 5a of the rotary vane 5 with regard to the aircraft wing profile. Secondly, in the region S2, the hinged aerofoil edge portion 8 is pulled towards the edge of the rotary vane 5, thereby forming a smooth wing surface and offering a clean entry for the airstream into the airstream gap 9.

The airstreams below and above the wing 10 then converge in region S3 substantially flowing in the same direction due to the shape of the rotary vane 5 so that the resulting converged airstream neither delaminates from the flap body 1 nor substantially forms any vortices on the upper surface of the flap body 1.

In the second actuated position PF2 the translatory movement portion dominates the rotary movement portion of the flap body 1 such that the flap body 1 moves substantially like a Fowler-type landing flap with positive pivot angle. In other words, the first actuated position PF2 may be used for landing of maximum lift assistance of the aircraft, with the pivot angle +δ2 being for example about +40°.

Figure 5:
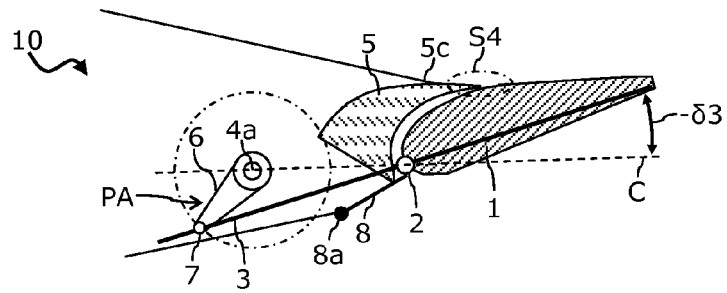
FIG. 5 schematically illustrates a cross section of the flaperon of FIG. 2 in a third actuated position.

Finally, FIG. 5 shows a schematical illustration of the aircraft wing 10 of FIG. 2 in a third actuated position PA. The third actuated position PA is achieved by turning the crank arm 6 downwards with respect to the centre line C. Similarly to the first actuated position PF1 this will result in a mostly rotary movement of the flap body 1 with little to none translatory movement. In particular, due to the congruent movement of the rotary vane 5 with the flap body 1, the flap body 1 does not penetrate into the wing structure, thereby enabling banking control as if using a conventional aileron, with the pivot angle −δ3 being for example about −20°.

Although the crank arm 6 is shown to be completely located within the aircraft wing profile 10 in FIG. 5, it might be possible to provide blisters or other housing parts on the bottom surface of the wing 10 in order to allow for the crank 4 to be rotated at any desired angle without the crank arm 6 sticking out of the wing profile 10. The necessity, shape and dimensions of such blisters or housing parts will depend on the specific geometry of the actuator and particularly the design of the crank 4.

With the different actuated positions PF1, PF2 and PA the maximum negative pivot angle −δ may correspond to a maximum banking control position of the aircraft flap and the maximum positive pivot angle +δ may corresponds to a maximum lift assistance position of the aircraft flap.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification. In particular, the embodiments and configurations described for the composite reinforcement components and structural elements can be applied accordingly to the aircraft or spacecraft according to the invention and the method according to the invention, and vice versa.

The embodiments were chosen and described in order to best explain the principles of the invention and its practical applications, to thereby enable others skilled in the art to best utilize the invention and various embodiments with various modifications as are suited to the particular use contemplated. In the appended claims and throughout the specification, the terms "including" and "in which" are used as the plain-English equivalents of the respective terms "comprising" and "wherein," respectively. Furthermore, "a" or "one" does not exclude a plurality in the present case.

What is claimed is:

1. An aircraft flap with aileron functionality, the aircraft flap comprising:
   a flap body; and
   an actuation mechanism comprising:
      a crank having a crank axle, a crank arm, and a crank pivot;
      a displacement shaft articulated to the crank pivot at an actuating end portion; and
      a rotatable linear-motion bearing in which the displacement shaft is slidably supported,
      the linear-motion bearing being rotatably attached at a pivot point to an aircraft wing comprising the aircraft flap, so that the displacement shaft is able to rotate around an axis running spanwise of the aircraft wing around the pivot point; and
      the displacement shaft being statically and fixedly connected to the flap body of the aircraft flap at a flap end portion of the displacement shaft opposite to the actuating end portion.

2. The aircraft flap according to claim 1, wherein the linear-motion bearing is a spherical plain bearing or a spherical rolling element bearing.

3. The aircraft flap according to claim 1, wherein the crank is actuated by a linear actuator.

4. The aircraft flap according to claim 3, wherein the linear actuator comprises one of a hydraulic actuator, a pneumatic actuator, a rack and pinion drive actuator, a spindle actuator, and a chain drive actuator.

5. The aircraft flap according to claim 1, wherein the crank is actuated by a rotary actuator.

6. The aircraft flap according to claim 5, wherein the rotary actuator comprises one of a hydraulic rotary actuator, a pneumatic rotary actuator, and a mechanical rotary actuator.

7. The aircraft flap according to claim 1, further comprising:
   a rotary vane fixedly attached to the linear-motion bearing, wherein an outer surface of the rotary vane proximate to the flap body has a contour substantially conforming to a contour of the flap body.

8. The aircraft flap according to claim 7, wherein the rotary vane comprises an outer surface distal to the flap body which has a contour substantially conforming to the contour of the aircraft wing.

9. The aircraft flap according to claim 7 further comprising:
   a hinged aerofoil edge portion hingably attachable to a downside surface of the aircraft wing.

10. The aircraft flap according to claim 9, wherein the hinged aerofoil edge portion is connected to the outer surface of the rotary vane proximate to the flap body by a linear slide bearing.

11. The aircraft flap according to claim 1, wherein the crank arm is actuatable in such a way that the displacement shaft is pivotable around the pivot point of the linear-motion bearing within a range between a maximum negative pivot angle and a maximum positive pivot angle with respect to a neutral position of the displacement shaft.

12. The aircraft flap according to claim 11, wherein the neutral position of the displacement shaft corresponds to a cruise flight position of the aircraft flap.

13. The aircraft flap according to claim 11, wherein the maximum negative pivot angle corresponds to a maximum banking control position of the aircraft flap, and wherein the maximum positive pivot angle corresponds to a maximum lift assistance position of the aircraft flap.

14. An aircraft comprising:
   at least one aircraft wing; and at least one aircraft flap with aileron functionality according to claim 1, the flap being arranged at a trailing edge of the aircraft wing.

15. The aircraft according to claim 14, wherein the pivot point of the linear-motion bearing is located within an outer profile of the aircraft wing.

16. The aircraft according to claim 14, wherein the aircraft comprises a plurality of aircraft flaps with aileron functionality, all of which are used both as landing flaps and as ailerons.

* * * * *